Patented Feb. 24, 1931

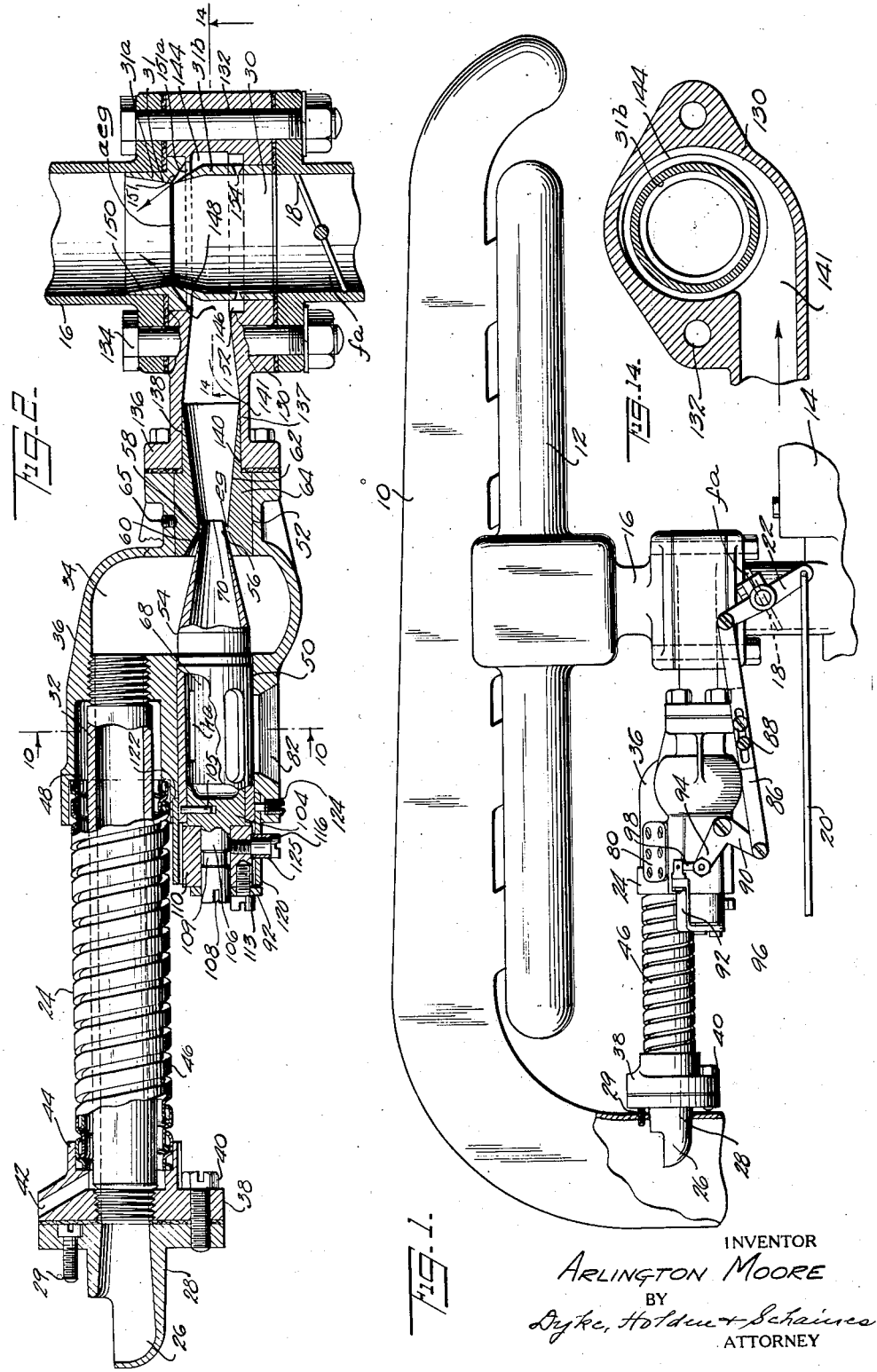

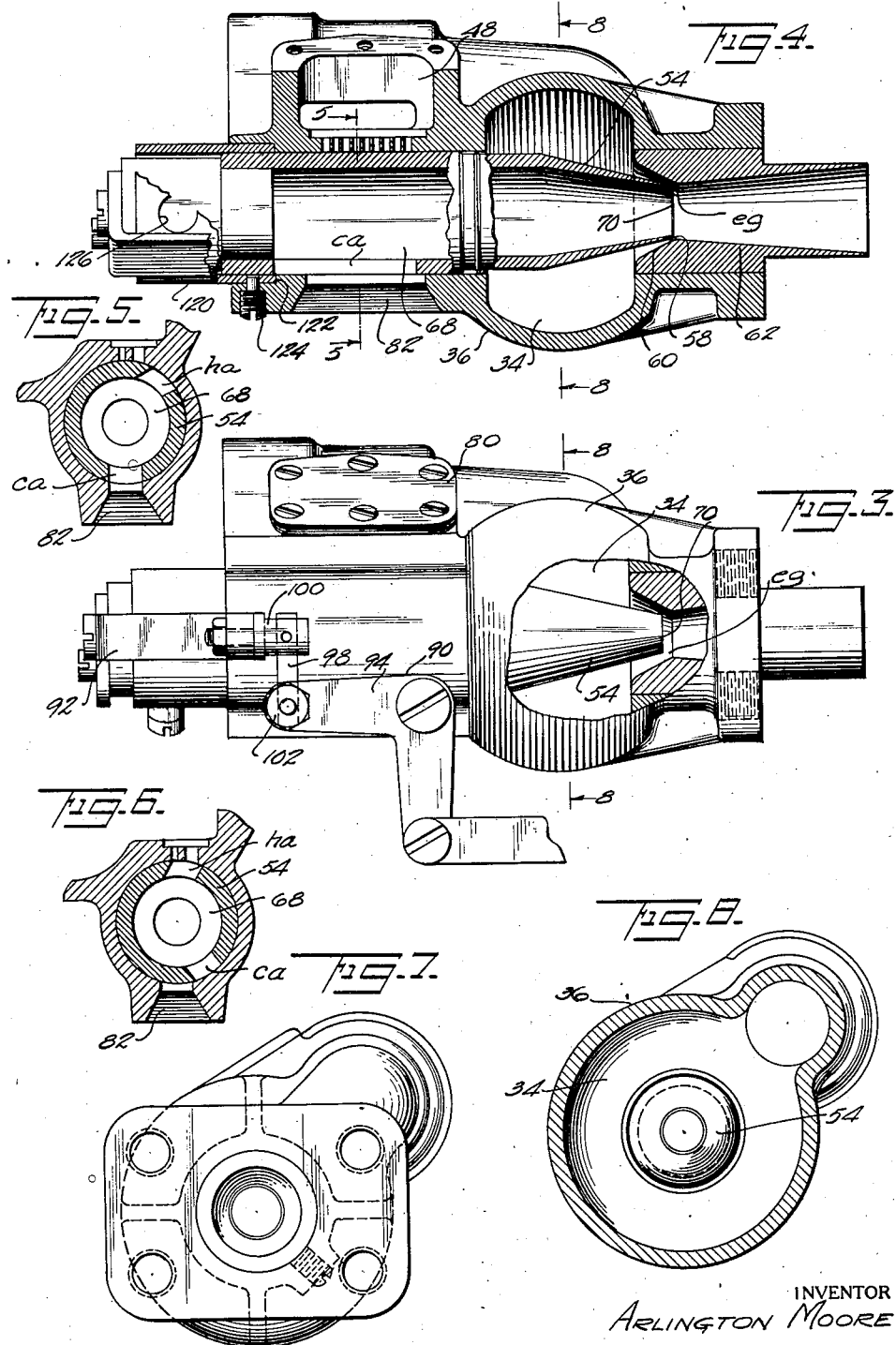

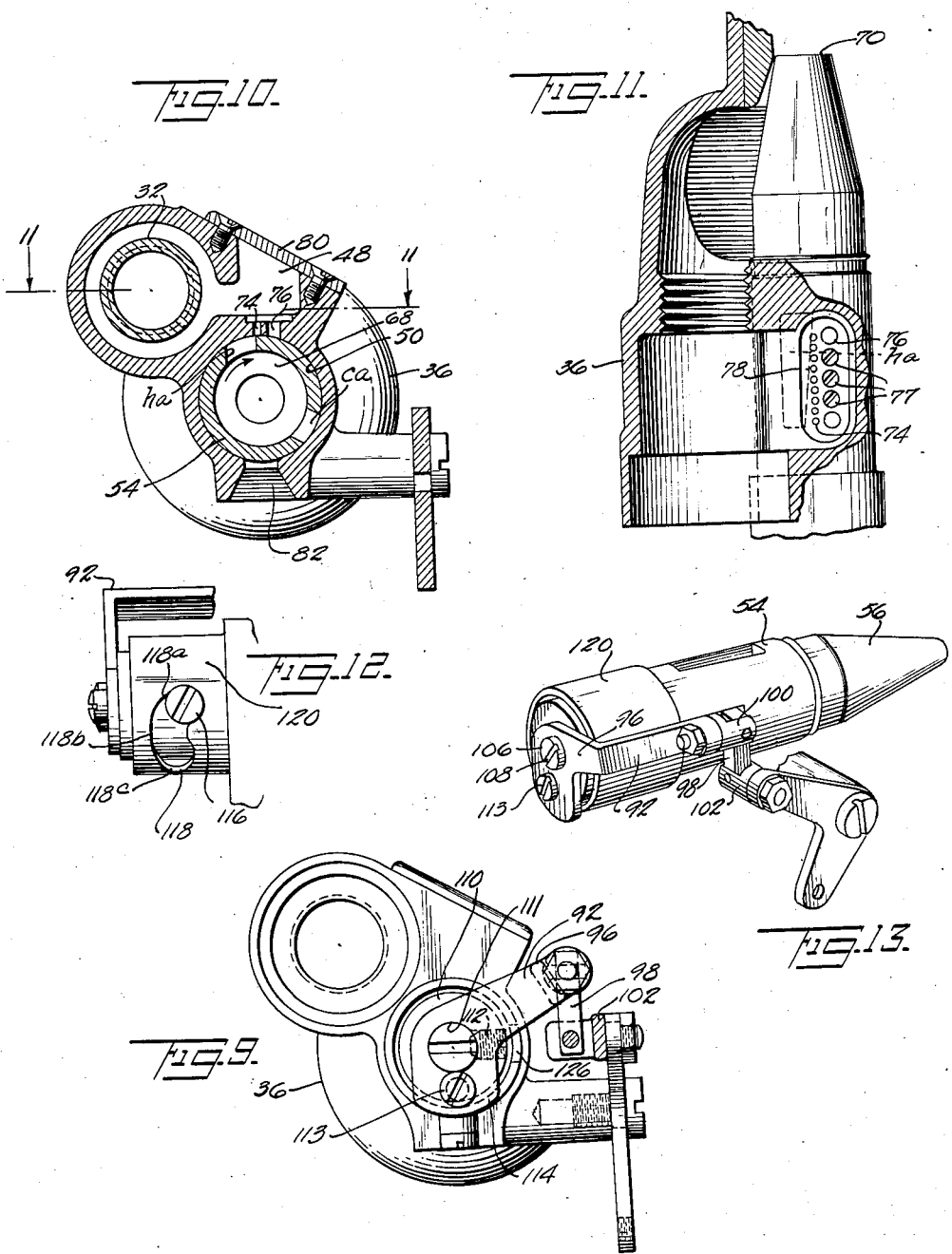

1,793,556

UNITED STATES PATENT OFFICE

ARLINGTON MOORE, OF NEW YORK, N. Y., ASSIGNOR, BY MESNE ASSIGNMENTS, TO MAXMOOR CORPORATION, OF NEW YORK, N. Y., A CORPORATION OF DELAWARE

APPARATUS FOR MODIFYING AND SUPPLEMENTING CHARGES FOR INTERNAL-COMBUSTION ENGINES

Application filed March 15, 1929. Serial No. 347,255.

My invention relates to the formation of charges for internal combustion engines, such as transportation engines, which are subject to wide variations in power and speed, and has for its principal object to provide a process of modifying and/or supplementing the charge mixture flowing to the cylinders together with simple and reliable apparatus for carrying such process into effect, so that the charge upon ignition is productive of efficient and economical engine operation.

The modification of the charge in accordance with my invention is such as to suit the engine requirements at different loads. One object of the invention is the supplying of supplemental gases in a highly heated condition into admixture with the fuel and air mixture at relatively low loads for vaporizing the fuel and producing a homogeneous charge mixture, and at higher engine loads supplying the supplemental gases at relatively lower temperatures in order to secure a desirably high weight of charge during full load or approximately full load operation.

The supplemental gases preferably comprise, at least in part, inert gases from the engine, as for example exhaust gases, and also air which is delivered into the intake with the exhaust gases. These inert gases are utilized at and toward the higher engine loads for injecting cool air and for suppressing detonation.

Another object of the invention consists in utilizing the inert gases from the engine for augmenting the flow of the main air towards the engine cylinders.

Another object consists in making provision for discharge of the stream of supplementary gases into the main air stream with a whirling motion to cause a thorough intermixing of the components of the two streams.

A further object consists in so controlling the supply of exhaust gas and air, and the temperature thereof, coextensively with the load variation, that same are supplied in the quantities and at the temperatures productive of beneficial results for the various load conditions.

Other objects will in part be obvious and in part be pointed out hereinafter.

In carrying out said process in its preferable embodiment provision is made for by-passing exhaust gas from exhaust to intake and metering the exhaust gas in such manner as to avoid undue dilution of the charge by the exhaust gas, while at the same time supplying the exhaust gas in sufficient quantity to raise the initial pressure materially during periods of low flow rate to the engine cylinders; and to perform this function, and in addition, to so modify the flame propagation during periods of higher flow rate as to avoid pinging and detonation.

During periods of low intake flow, when the tendency is toward too much cooling (by a cooling system which must have capacity for withdrawal of heat sufficient to take care of all conditions of engine operation), and charge rarefaction is not a detriment, the exhaust gases supplied to the engine cylinders are hot and have metered additions of preheated air made thereto; while during the periods of high intake flow, when over-cooling is not encountered and maximum weight of charge in the engine cylinders is important in order to secure full power and volumetric efficiency, and detonation is frequently encountered especially with high compression engines, the exhaust gas is supplied in quantity sufficient to suppress detonation. This exhaust gas is cooled as for example by commingling cold air therewith, and the kinetic energy of the flowing exhaust gas is utilized to aspirate the cold air therewith and to augment main air flow to the engine cylinders without need to resort to a mechanical supercharger.

In the accompanying drawings I have shown apparatus illustrative of my invention.

In the said drawings

Figure 1 is a side view showing the manifold assembly of an internal combustion engine, with the bypass conduit means of the present invention interposed between the exhaust and intake conduits;

Fig. 2 is an enlarged longitudinal sectional view of the bypass conduit means. These views show the throttle closed and the metering and aspirating member and actuating parts in corresponding position;

Fig. 3 is an enlarged side elevation with parts broken away of the metering element of said bypass means, the parts being shown at substantially the position corresponding to half open throttle;

Fig. 4 is a part longitudinal sectional and a part side elevational view of the element shown at Fig. 3 the parts being shown in position corresponding to wide open throttle;

Fig. 5 is a section on line 5—5 of Fig. 4;

Fig. 6 is a section similar to that of Fig. 5 but showing the parts in position for idling.

Fig. 7 is a right hand end view of the element shown at Fig. 3;

Fig. 8 is a transverse sectional view taken approximately on the line 8—8 of Figs. 3 and 4;

Fig. 9 is a left hand end view of the element of Fig. 3;

Fig. 10 is a transverse section taken approximately on the line 10—10 of Fig. 1;

Fig. 11 is a fragmentary horizontal section taken approximately on the line 11—11 of Fig. 10;

Fig. 12 is a bottom plan of a cam slot member for producing endwise movement of the aspirating and metering member;

Fig. 13 is a perspective showing the mechanism for effecting movement of the metering and aspirating member; and Fig. 14 is a section on the line 14—14 of Fig. 2.

Reference characters 10 and 12 designate respectively the exhaust and intake manifolds of an internal combustion engine of the transportation engine type, such as an automobile engine, for example, and 14 designates a conventional fuel and air mixing device, such as a carburetor, connected to the intake manifold by the riser 16 containing a throttle valve 18 adapted to be actuated through the customary link 20 and crank arm 22, and which, with the use of the usual carburetor, controls the flow at *fa* of the main fuel and air stream to the engine cylinders.

The bypass conduit indicated generally by reference character 24 and extending from the exhaust conduit 10 to the intake conduit 12, is connected to the exhaust conduit 10 in such a way as to withdraw a portion of the exhaust gases without material reduction of their velocity and thereby get the benefit of the kinetic energy of the moving exhaust gas.

This can be done most effectively and satisfactorily by making proper provision therefor in the course of engine manufacture, but in making accessory installations, subsequent to engine manufacture, as has been chosen for the purpose of illustration in the showing of the drawing, an impact or Pitot tube 26, having a taper neck 28, is inserted so as to fit in a taper hole formed in the side of the exhaust conduit, and held in place therein by screws 29, and has its open mouth exposed to face upstream relative to the direction of flow of exhaust gases. The exhaust gas that enters the impact tube and is bypassed to the intake conduit, together with the air added in the bypass conduit 24, is delivered to the riser 16 above the throttle 18 and in the direction of charge flow toward the engine cylinders, such discharge being preferably effected through the upwardly directed annular orifice *aeg*, surrounding the central passage 30, provided for the passage of the fuel and air stream from the carburetor, and past the throttle 18 at *fa*. Said annular orifice *aeg* is preferably arranged at the throat 31 of a Venturi passage formed by the two tubular members 31a, 31b, whereby, when the velocity of discharge at *aeg* exceeds the velocity at *fa*, to aspirate the fuel and air mixture toward the engine cylinders.

From the Pitot tube 26, exhaust gas is supplied through the pipe 32 to the equalizing chamber 34 in the metering and aspirating element 36, in which the pulsations of exhaust gas flow are smoothed out. Pipe 32 may be conveniently connected to the Pitot tube 26 by means of a flanged coupling 38 and bolts 40. The flanged coupling 38 shown herein contains an air inlet passage at 42 and is provided with a flanged extension 44 for receiving one end of a sleeve member 46, here shown as being made from flexible tubing, through which air admitted at 42 is delivered to the chamber 48 in element 36. This air is preheated by contact with the hot exhaust conduit and also by its passage through sleeve 46 containing the hotpipe 32 through which the exhaust gas is passed.

The metering, mixing and aspirating element 36 is preferably made as a casting and is provided with a bore 50 adjacent and beyond the exhaust gas chamber 34, as shown at 52, so that both these passages may be in accurate alignment and can be made by a single passage of one and the same boring tool.

Bore 50 receives and forms the bearing support for the rotatable and slidable metering and aspirating member 54, which serves to control the admission of exhaust gas by the longitudinal movement thereof and also serves to control the admission of both heated and cool air by the rotation thereof. The combining of these several functions, in the single element permits of a substantial reduction in the number of parts required and in the size of the apparatus, resulting in a saving in material and construction costs, and promotes certainty and efficiency in the operation thereof.

Said member 54 terminates at its discharge end in a taper nozzle 56 adapted to be moved longitudinally into and be retracted from throat 58 of the Venturi passage comprising the contracting part 60, and the expanding part 62 in the Venturi tube member 64. Said member 64 is held in place in the bore 52 as by the set screw 65 and is in accurate alignment with the member 54 because of the alignment of bores 50 and 52. By movement of the member 54 and the taper nozzle 56 thereof forward and back with respect to throat 58, the extent of opening of the annular passage *eg* between nozzle 56 and throat opening 58 is varied or controlled, and this pasasge, in connection with pressure difference effective upon opposite sides thereof serves to effect the metering of the quantity of exhaust gas passing through bypass conduit 24. The aspiration of air by the annular stream of exhaust gas is most effective when the mouth 70 of the aspirator nozzle 56 is directly in the throat 58. With a slight opening of the throttle, as in idling the engine, nozzle 56 is moved to the right and the opening of port *eg* for passage of exhaust gas is correspondingly small. With wider opening of the throttle port *eg* is opened up by moving member 54 to the left one such position being shown in Fig. 3 and at full throttle opening the mouth 70 of nozzle 56 of member 54 is opposite the Venturi throat 58 and in the best aspirating relation as shown in Fig. 4.

Provision is made for delivering and metering preheated air and for delivering cold air respectively through ports in the side wall of the nozzle member 54 directly into the bore 68 of said member 54, from which the air passes out through the mouth 70 in aspirating relation to exhaust gas moving from the equalizing chamber 34 through the annular passage *eg*.

The hot air port *ha*, formed in the wall of member 54, is adapted, upon rotation of member 54 in the direction of the arrow on Fig. 10, to come into register first with the small holes 74 and then with the larger holes 76, extending from the preheated air chamber 48 to bore 50. The forward side 78 of the preheated air port *ha* is of inclined or "cleaver" formation, so as to effect a gradual opening up of the preheated air passages 74, 76 of which latter a sufficient number is provided so that some may be closed off as by screw plugs 77, if it is found that with all the holes 76 open the preheated air supply is greater than required. Access for this and other purposes can be had to chamber 48 by removal of the cover plate 80. Quite close regulation of the extent of opening of the preheated air passages is required, inasmuch as the pressure difference across these ports is relatively high, these ports being in use during periods of low intake flow when the throttle opening is relatively small.

The cold air inlet passage 82 is preferably formed directly in the wall of the casting 36 and communicates with the bore 50, and admission of cold air is regulated by the extent of registration of the cold air port *ca*, formed in the side wall of member 54, with said passage 82. It is to be noted that the bore size of nozzle mouth 70 is so chosen as to pass the maximum requirement of cold air and no more, and that passage 82, port *ca*, are made considerably larger than this so as not to impede the passage of a sufficient supply of cold air. Thus it is possible to limit or adjust the rotational movement and initial position of member 54 so as to secure any needed regulation of the extent of opening of the hot air port *ha*, without effecting any change of material consequence in the cold air supply, which is not admitted until the preheated air ports are closed or beginning to close, and the final metering whereof is accomplished by suitably choosing the bore size of nozzle mouth 70.

Member 54 is actuated preferably by mechanical interconnection with the throttle to move longitudinally and thereby vary the extent of opening of passage *eg* for metering the exhaust gas that is bypassed, and also to turn or rotate about its axis to a limited extent and thereby open and close the ports for passage of preheated air and cold air.

The interconnecting parts, as shown, include a link 86, provided at 88 with means for shortening or lengthening its effective reach, pivotally connected at one end to the throttle crank arm 22, an elbow lever 90 pivotally mounted on the casting 36 and to which the other end of link 86 is connected, a crank arm 92 connected to cause the metering member 54 to turn on its axis in bore 50, and a universal link connection between the arm 94 of elbow lever 90 and the laterally extended part 96 of crank arm 92, comprising a short link 98 and universal pivotal connecting members 100 and 102 at its opposite ends. The lever and link connections can, of course, be varied if desired.

The parts described serve to cause the member 54 to turn rotationally, as the throttle is opened and closed, the preheated air port *ha* being first to open (Fig. 10) and being followed by the opening of the cold air port *ca* as the throttle is moved toward its wide open position. (Fig. 5). The means for obtaining longitudinal movement of member 54 will presently be described.

The metering and aspirating member 54 is closed at the end thereof opposite nozzle 70 to render the same immune to pressure differences retarding longitudinal movement thereof. For this purpose a plug 104, which is preferably separate, is fastened rigidly in place by suitable means, such as the dowel pin 105. In this way the making and machining of the parts is facilitated. Plug portion 104 is provided with an axially projecting stem 106 which may have a screw slot 108 in the end thereof for facilitating the making of adjustments, and stem 106 is preferably provided with a circumferential groove 109. A collar 110 is fastened upon stem 94 by means of the set screw 112 (Fig. 9) which enters the groove 109.

Crank arm 92 is provided with a central opening 111, adapted to fit over the stem 106, and is secured to collar 110 by means of the screw 113 passing through the extension 114 of the crank arm 92.

A screw 116, screwed upwardly into the lower side of collar 110, passes through a cam slot 118 (Fig. 12) formed in the tubular cam slot member 120 which is received in the countersunk portion 122 at the outer end of bore 50 and held in place therein by the shoulder screw 124. The portion of screw 116 which works in the cam slot 118 is preferably surrounded by a wear bushing 125. Member 120 has a hole 126 therein to afford access by means of a screw driver to the set screw 112 of collar 110. Cam slot 118 is of formation to secure proper endwise movement of the member 54 for metering of exhaust gas, and any desired longitudinal movement can be readily obtained by interchange of the cam slot bushings, which have cam slots formed therein suited to the characteristics of various engines.

With the cam slot 118 of the form shown, it will be seen that with screw 116 making engagement with the first end portion 118$^a$ thereof (Fig. 12) nozzle 70 is in position for substantially maximum reduction of opening of exhaust gas port eg (Fig. 2). When the member 54 is turned so that screw 116 engages the portion 118$^b$ of cam slot 118 the opening at eg is the maximum (Fig. 3). With the screw 116 engaging the last portion 118$^c$ of cam slot 118 the member 54 and nozzle mouth 70 are moved so that the latter is substantially at the Venturi throat 58 (Fig. 4). This is the full load position at which maximum aspiration of cold air is desired and in this position the aspiratory action is most effective, as stated above. By engagement of screw 116 with the cam slot member at the ends of slot 118 stops for rotational movement of member 54 can be obtained if desired.

It will be apparent that in case further rotational adjustment of member 54 is desired than is available by changes in the reach of link 86, as for example to regulate the extent of opening of the port ha for preheated air screw 112 may be loosened, leaving the member 54 to be turned a suitable distance with respect to collar 110, as by means of a tool inserted in slot 108 of stem 106, and when the desired relation is obtained, it can be held by retightening screw 112.

As already stated, the cam bushing 120 can be readily replaced by another with a different form of cam slot 118 when desired, and all the parts are of simple construction, including the metering member 54 and the aspirator bushing 64 and can be readily replaced by others of different port, nozzle and cam areas and outlines enabling the apparatus to be readily and quickly adapted to the characteristics of a particular engine.

In making an accessory connection of the bypass conduit to the intake riser, I preferably lower the carburetor and insert a suitable connecting member between it and the lower end of the intake riser. Such member is desirably of the form indicated at 130 and comprises a tubular casting provided with holes 132 receiving bolts 134 for connecting the carburetor to the riser with the member 130 interposed therebetween.

The member 36 is bolted to the flange 136 on the outer end of the tubular extension 137 formed on the casting 130. The outer end portion 140 of the Venturi member 64 is received within the passage 138 in said tubular extension 137 which passage communicates with the interior of the member 130.

The end portion 140 has the outwardly flaring passage 62 therein while the portion 141 of the passage 138 is of uniform cross-section in communication with the annular vertical passage 144 intermediate the casting 130 and the member 31$^b$. For constructional purposes the portion 141 is rectangular in cross-section and gradually decreases in depth and increases in width towards the passage 144, whereby to maintain the cross-sectional area substantially the same throughout the length of said portion 141.

The passage 62, 141 between the nozzle 70 and the annular passage 144 permits of the expansion of the gases as the same pass through the diverging portion 62 towards the enlarged portion 141 of the passage. The passage portion 141 communicates with the passage 144 eccentrically or tangentially as shown at Fig. 14 and as the gases enter the latter, a cyclonic or whirling motion is imparted thereto. The whirling gases escape at high velocity through the constricted annular orifice aeg into the fuel and air stream to impart a high degree of turbulence thereto.

The Venturi member 31a is supported on a shoulder 146 formed in the upper end of the casting 130 and is received between the same and the riser 16. The member 31a has a portion which extends into the riser 16 and which has an upwardly diverging passage 150.

The thimble 31b converges at its upper end 148, providing with the passage 150 a venturi serving to accelerate the fuel and air stream at the orifice aeg, and also forming with the lower downwardly diverging portion 151 of the member 31a a discharge passage 151a gradually decreasing in cross-section to the orifice aeg thereof. The whirling exhaust gas and air mixture is thus made to pass through the orifice aeg at relatively high velocity to exert an aspirating action on and to augment the flow of the fuel and air mixture which is momentarily accelerated by the venturi 148—150. The whirling movement of the gases passing through the orifice *aeg* and the direction of discharge of said gases to some extent produce a high degree of agitation or turbulence in the gaseous mass to effect a thorough mixing of the constituents thereof and thus obtain a homogeneous charge mixture. The cross-sectional area of the orifice *aeg* should be greater than the cross-sectional area of the orifice *eg* to prevent the building up of pressure in the passage 62—141 such as to impair the operation of the device.

The thimble 31*b* also serves to trap or catch any fuel precipitated on the walls of the riser or manifold and returning downwardly along the walls thereof towards the carburetor. Such fuel collects in the annular well 152, and is delivered back, particularly upon acceleration, into the fuel and air stream through the openings 154. The member 31*a* thus prevents fuel creepage to points below the throttle where it is less readily picked up by the fuel and air stream, and provides a source of surplus fuel automatically replenished and available upon acceleration for supplementing the main fuel jet.

Operation

An understanding of the operation of the device of the present invention will be assisted by a comparison of operating conditions for part load with those for full load operation.

There is a very practical general distinction and difference other than of mere degree between operating a transportation internal combustion engine, such as an automobile motor, at partial loads and at full load.

In full load operation, which in automobile practice, for example, is most commonly made use of for hill climbing, and in airplanes for rising, the principal and controlling factor is maximum power production.

In operating at partial loads, which is accomplished by restricting the intake conduit to less than the full and unrestricted passage used at full load, it is always possible at need to obtain additional power by further opening of the intake conduit, and for this reason maximum power production does not enter as a controlling factor into part load operation, and it becomes possible to fix operating conditions for maximum economy.

Heat

At part load, heat of compression is below the maximum, the cooling system capacity is generally so great as to tend to overcooling, and initial cylinder pressure is below the maximum wherefore heat rarefaction of charge is not a detriment, so that substantially all available heat can be utilized for gasifying heavy ends of fuel. At full load, the heat of compression is at the maximum, the cooling system is operating at substantially full capacity and therefore with little or no tendency to overcooling, full power is dependent upon obtaining substantially maximum initial cylinder pressure by full weight of charge being delivered into the engine cylinders and charge rarefaction by heat would be decidedly detrimental. Accordingly, during part load operation port *ha* for preheated air is opened to a suitably graduated extent and preheated aid supplied therethrough, whereas at full load, cold air port *ca* is open and port *ha* closed. The cooling of the exhaust gas by the cold air at full load to under 212° F., reduces the charge volume and increases its weight by condensing the $H_2O$ component constituting substantially half the exhaust gas which is bypassed from exhaust to intake.

Charge impetus

At part loads, the push of the outside atmosphere toward the region of reduced pressure created by the intake stroke of the engine piston is principally depended on for producing flow to the engine cylinders past the restrictions of the intake conduit, and this suffices as the intake pressure is relatively low, and the pressure differences on the opposite sides of intake restrictions are relatively high. At full load, however, there is not much difference between the atmospheric pressure and that in the intake conduit and any available supplementary source of energy for delivering charge components to the engine cylinders is beneficial. Such a source of energy is available in the exhaust gas stream which reaches its maximum pressure and velocity at full engine loads.

Thus at part loads the axial rotation and longitudinal movement of the member 54 serve simply to control the extent of restriction to entrance to the intake conduit and thereby the flow of charge constituents including exhaust gas responsive to pressure differences, whereas at full load the mouth of the nozzle 70 is so related to the throat 56 of Venturi member 60 as to provide an efficient aspirator delivering the cold air with the exhaust gas by the pressure and velocity energy of the latter. As already stated, the condensation in the aspirator of the steam making up a large part of the exhaust gas taken from the exhaust gas conduit materially assists the aspirating of cold air.

Exhaust gas quantity

At part loads, addition of exhaust gas to the charge simply raises the initial cylinder pressure without taking the place of active charge constituents and thus the charge may contain material proportions of inert exhaust gas to good advantage in the way of heat supply and economy generally. At full loads, however, undue dilution of the charge by exhaust gas is harmful to the extent that this inert material occupies space that could be filled with active constituents, for example, fuel and oxygen. On the other hand, charge addition of new quantities of exhaust gas to the unscavenged exhaust gas remaining in the combustion space from the prior cycle is useful for modifying flame propagation in a manner to suppress detonation. Inasmuch as increase in engine compression ratio both produces higher pressures which speed up the rate of flame propagation and so tend to increase detonation and, by reducing the clearance space, cuts down the proportion of unscavenged exhaust gas, the quantity of exhaust gas to be supplied with the charge during full load operation for the stated purpose of suppressing detonation is dependent in large measure upon the compression ratio, a relatively small quantity sufficing where the compression ratio is low and larger quantities for a high compression engine.

By the described arrangement, whereby the member 54 is actuated so that the nozzle mouth 70 is moved in past the throat 58 to meter a very small quantity of exhaust gas for idling, is moved back beyond throat 58 to meter and supply additional quantities of exhaust gas during various part load conditions, and is brought to most effective aspirating position at the throat 58 and serves to meter the proper quantity of exhaust gas during full load operation, all the desiderata in this regard are secured by my apparatus, including avoidance of mere dilution at full load because active oxygen-containing air is aspirated and delivered with the exhaust gas. Best results are secured in practice by varying the nozzle and/or Venturi sizes for varying compression ratios and engines, the best size for the passage $eg$ being slightly smaller than that found to be productive of a falling off of power. Such changes are readily made and standards established following the stated principles.

Richness of charge

At part loads, a mixture ratio of about 16–18:1 is economical and with addition of exhaust gas to the charge produces complete combustion with no, or practically no CO (carbon monoxide) in the exhaust gas. At full power operation, a richer mixture of the order of 12–14:1 is preferable. At part loads, the inward push by exterior pressure toward the cylinders where reduced pressure is caused by intake strokes of the pistons, is divided between the fuel-and-air port $fa$ and the exhaust-gas-and-air port $aeg$, so that speed of air flow past the fuel nozzle and consequently the fuel supply is relatively cut down. At full loads there is a secondary aspiration of the fuel and air stream by the exhaust gas and primarily aspirated cold air mixture introduced at the annular throat orifice $aeg$, thereby speeding up the air introduced at $fa$, and increasing the proportion of fuel to air. At all times a very thorough mixing of the several charge components is secured at and just above the annular orifice $aeg$.

Acceleration

During periods of deceleration with high restriction of the intake conduit and considerable reduction of flow therein, fuel may accumulate on the wall of the conduit and particularly the wall of the intake manifold riser. With the arrangement herein described, this fuel will gravitate along the walls to the well 152, and upon the lessening of conduit restriction and increased flow to the engine cylinders for purposes of engine acceleration, this fuel accumulation in the annular well 152 will be redelivered to the charge stream through openings 154, thereby compensating for temporary lag of fuel supply from the carburetor fuel jet which ordinarily accompanies reduction of intake depression upon opening up of the intake conduit, and giving the temporary relatively rich mixture required for good pick-up.

Reference is made to my following copending applications disclosing and claiming other species of the generic invention herein broadly claimed:

| Ser. No. | Filed | Title |
| --- | --- | --- |
| 611,391 | Jan. 8, 1923 | Conversion valve. |
| 757,075 | Dec. 14, 1924 | Conversion valve. |
| 26,265 | Apr. 27, 1925 | Mixture conversion apparatus for internal combustion engines. |
| 26,618 | Apr. 29, 1925 | Boosting system for internal combustion engines. |
| 64,522 | Oct. 24, 1925 | System of and apparatus for combustion control for internal combustion engines. |
| 85,450 | Feb. 2, 1926 | System of controlling combustion in internal combustion engines. |
| 114,545 | June 8, 1926 | Conversion valve for internal combustion engines. |
| 118,963 | June 28, 1926 | Charge modifying apparatus for internal combustion engines. |
| 124,923 | July 26, 1926 | Sylphon controlled charge modifying apparatus for internal combustion engine. |
| 154,345 | Dec. 13, 1926 | Process of preparing charges for combustion in internal combustion engines. |
| 158,015 | Dec. 30, 1926 | Apparatus for control of combustion in internal combustion engines. |
| 167,830 | Feb. 12, 1927 | Process of exhaust gas aeration. |
| 173,388 | Mar. 7, 1927 | Charge supplementing apparatus for internal combustion engines. |
| 181,711 | Apr. 7, 1927 | Charge supplementing apparatus for internal combustion engines. |
| 188,326 | May 2, 1927 | Auxiliary fuel supply means for internal combustion engines of low intake depression. |
| 207,938 | July 23, 1927 | Apparatus for control of combustion in internal combustion engines. |
| 243,616 | Dec. 30, 1927 | Charge forming apparatus for internal combustion engines. |

I claim:

1. The combination with the intake conduit, throttle and main fuel delivering means of an internal combustion engine, of a tubular portion disposed within and in spaced relation to said intake conduit beyond the throttle and forming an annular passage open at the end thereof towards the engine cylinder, said passage constituting a trap for receiving fuel creeping downwardly along the wall of the intake conduit, means for supplying exhaust gases to said intake conduit through said annular passage, and means for returning the trapped fuel through the wall of said tubular portion to the intake conduit.

2. The combination with the intake conduit, throttle and fuel delivering means of an internal combustion engine, of a Venturi member in said conduit beyond said throttle, a tubular portion within and in spaced relation to said intake conduit beyond the throttle and forming an annular passage having a relatively constricted discharge orifice substantially at the constriction of said venturi, and constituting a trap for receiving fuel creeping downwardly along the wall of the intake conduit, means for supplying supplementary gases tangentially to said annular passage for imparting a cyclonic movement to said gases, and means through the wall of said annular portion for the passage of the trapped fuel into the intake conduit.

3. The combination with the intake conduit, throttle and fuel delivering means of an internal combustion engine, of a Venturi-like portion in said conduit, a tubular portion within said intake conduit in spaced relation to the wall thereof and forming therewith an annular passage; said tubular portion at the end thereof converging inwardly and forming with the part of said Venturi-like portion towards the engine cylinders a venturi for the passage of the gaseous medium passing the throttle and forming a relatively constricted annular discharge orifice from said annular passage substantially at the constriction of said venturi, and means for supplying supplementary gases through said annular passage into the intake conduit.

4. In an internal combustion engine comprising exhaust and intake conduits, a bypass conduit for exhaust gases from exhaust to intake, and a hollow exhaust gas metering member movable longitudinally to meter exhaust gas passing around it, and rotatable to control passage of air into and through its interior for delivery into the bypass conduit.

5. In an internal combustion engine comprising exhaust and intake conduits, a bypass conduit for exhaust gases from exhaust to intake, and valve means in said bypass conduit movable longitudinally to meter the exhaust gas and rotatable to control the admission and metering of air into and through said bypass conduit.

6. In an internal combustion engine comprising a bypass conduit from exhaust conduit to intake conduit, and tubular valve means in said bypass conduit movable longitudinally to meter exhaust gas and rotatable to control admission of preheated air and cool air therethrough into said bypass conduit.

7. In an internal combustion engine comprising a bypass conduit from exhaust conduit to intake conduit, a tubular valve member closed at one end and open at its opposite end and longitudinally movable in said bypass conduit to meter exhaust gas passing around said valve member, said valve member having a lateral port for the admission of air thereto and being rotatable to control the admission of air to said bypass through the bore in said valve member.

8. In an internal combustion engine comprising a bypass conduit from exhaust to intake, a relatively constricted air injector portion therein, a tubular valve member closed at one end and open at the other end and movable longitudinally in said bypass conduit to vary the position of said open end relative to said injector portion to control the passage of exhaust gas, said tubular valve member having lateral ports for the admission of preheated and cool air thereto for delivery of air therethrough into the bypass conduit and being rotatable to alternately open and close said ports, and means for imparting simultaneous longitudinal and rotational movement to said valve member.

9. In an internal combustion engine, comprising a bypass from exhaust to intake, an air heater disposed about said bypass, and having an outlet of regulatable area for bleeding heated air from said heater, a relatively constricted air injector portion in said bypass beyond said heater, a tubular valve member closed at one end and open at the other end and movable longitudinally in said bypass to vary the position of the open end thereof relative to said injector portion, said tubular valve member having a lateral port adapted to register with said heater outlet for the admission of heated air thereto and a port for the admission of cold air thereto, and being rotatable for alternately opening and closing said ports, and means for actuating said valve member adjunctively to throttling.

10. In an internal combustion engine comprising exhaust and intake conduits, a throttle in the intake conduit, a bypass from the exhaust conduit to the intake conduit above the throttle, an injector portion in said bypass, an air conducting nozzle disposed in said bypass and forming an annular exhaust gas orifice about the air discharge end thereof at said injector portion, said nozzle being closed at the opposite end thereof and having a lateral port for the admission of air thereto, and being longitudinally and rotatably movable, an arm extending laterally from the outer end of said nozzle, a bell crank lever, a universal connection between one arm of said bell crank and said nozzle arm, a connection between the other arm of the bell crank and said throttle, a member having a cam slot of predetermined configuration, and a pin on said nozzle riding in said slot for controlling the longitudinal movement of the nozzle upon rotation thereof from the throttle.

In testimony whereof, I have signed my name hereto.

ARLINGTON MOORE.